United States Patent [19]

Richter

[11] Patent Number: 4,815,598

[45] Date of Patent: Mar. 28, 1989

[54] STORAGE MAGAZINE WITH PLURAL LEAF SPRINGS FOR RECORDING TAPE CASSETTES IN THE CASSETTE BOXES

[75] Inventor: Herbert Richter, Pforzheim-Buchenbronn, Fed. Rep. of Germany

[73] Assignee: Herbert Richter, Metallwaren-Apparafebau GmbH & Co., Pforzheim-Buchenbronn, Fed. Rep. of Germany

[21] Appl. No.: 131,408

[22] Filed: Dec. 10, 1987

[30] Foreign Application Priority Data

Oct. 27, 1987 [EP] European Pat. Off. ........ 87115729.3

[51] Int. Cl.⁴ ............................................. B65D 85/67
[52] U.S. Cl. .................................. 206/387; 224/273; 296/37.12; 312/12; 312/15; 312/320
[58] Field of Search ...................... 312/320, 9, 10, 12, 312/15, 319; 206/387; 224/273, 42.42; 296/37.8, 37.12, 37.1, 37.15, 37.14

[56] References Cited

U.S. PATENT DOCUMENTS

| 3,756,383 | 9/1973 | Kryter | 206/387 |
| 4,231,625 | 11/1980 | Peroz et al. | 206/387 X |
| 4,285,554 | 8/1981 | Bell et al. | 312/9 |
| 4,440,458 | 4/1984 | Berkman | 312/9 |
| 4,512,468 | 4/1985 | Stravitz | 206/387 |
| 4,678,081 | 7/1987 | Richter | 206/387 |
| 4,705,169 | 11/1987 | Mastronardo | 206/387 |

FOREIGN PATENT DOCUMENTS

| 0134279 | 3/1985 | European Pat. Off. | 206/387 |
| 0143609 | 6/1985 | European Pat. Off. | 206/387 |

*Primary Examiner*—Stephen Marcus
*Assistant Examiner*—Bryon Gehman

[57] ABSTRACT

A storage magazine for recording tapes has disposed in a housing a plurality of chambers of a cross-section which corresponds to the cross-section of commercially available cassette boxes, the chambers being formed by drawer-like plastic components disposed on top of one another and compressed within the housing. The drawer-like components have tongue-like extensions projecting from the housing and being somewhat narrower than a cassette box to facilitate insertion and removal of a box and they also have, adjacent each chamber, a leaf spring structure depending into the adjacent chamber and having a spring force sufficient to deflect the adjacent wall of a cassette box into engagement with a cassette therein thereby to prevent rattling thereof and to lock the box in said chamber.

6 Claims, 2 Drawing Sheets

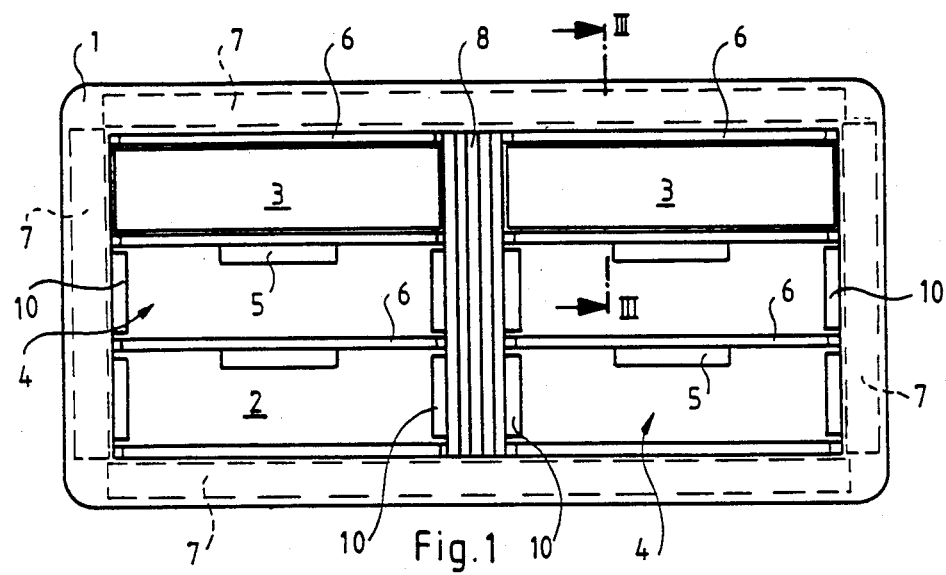
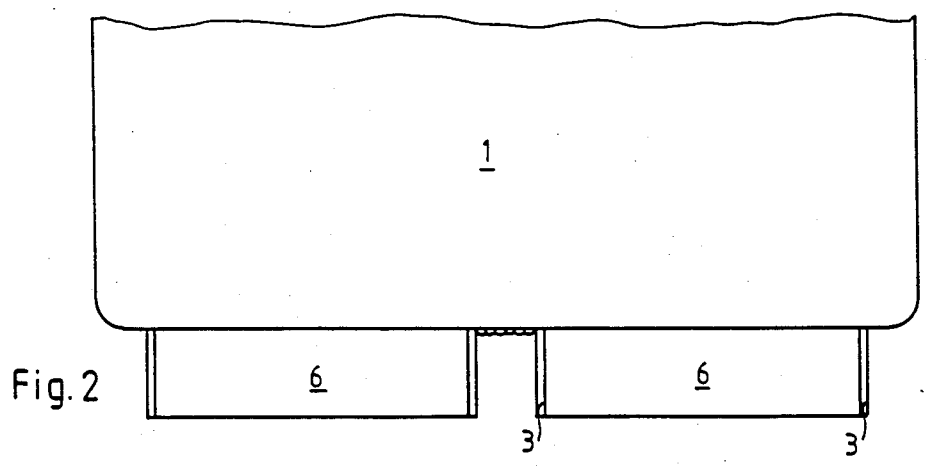

STORAGE MAGAZINE WITH PLURAL LEAF SPRINGS FOR RECORDING TAPE CASSETTES IN THE CASSETTE BOXES

BACKGROUND OF THE INVENTION

The invention relates to a storage magazine for recording tape cassettes especially for use in automobiles which magazine has arranged in a housing a plurality of chambers each providing a space for the reception of a single recording tape cassette, the chambers being formed by drawer-like components which consist of plastic material and, stacked on top of one another, are mounted in the magazine housing.

A similar storage magazine is described in Applicant's earlier U.S. Pat. No. 4,678,081 of July 7, 1987, which magazine however is adapted to receive the tape cassettes alone. In order to prevent rotation of the cassette reels for example by the constant vibrations in an automobile which might loosen the tape, the reels are engaged by resiliently supported locking members when a cassette is inserted into the magazine. Such locking members however are arranged already in the tape cassette box and they serve the same purpose, that is, they prevent rotation of the reels of a recording cassette stored therein.

All cassette storage magazines for automobiles are based on the assumption that the cassettes should be stored alone in order to keep the volume as low as possible since space in an automobile is at a premium and also to retain the reels very safely. However the cassette storage magazines provided with locking members are relatively complicated and therefore relatively expensive to manufacture. In addition such cassettes are exposed to dust to a greater degree which fact is greatly disliked by music lovers, who for this reason, often keep their cassettes in the original boxes in the automobile—generally on one of the passenger seats.

It is the principal object of the present invention to provide a storage magazine adapted to receive cassettes in a sealed fashion so that they are not exposed to dust, a magazine that furthermore is simple and very inexpensive to manufacture.

SUMMARY OF THE INVENTION

A storage magazine in accordance with the present invention has a plurality of chambers of a cross-section corresponding to that of commercially available tape cassette boxes, the chambers being formed by drawer-like plastic components disposed on top of one another and compressed within a magazine housing together with foamed plastic sheets surrounding the drawer-like plastic components. The drawer-like components have tongue-like extensions projecting from the housing and being somewhat narrower than a cassette box to facilitate its insertion into, and its removal from, the chamber. They also have, adjacent each chamber, a leaf spring structure formed and depending from the drawer-like component into the chamber and having a spring force sufficient to slightly deflect the adjacent wall of a cassette box into engagement with a cassette therein thereby to prevent rattling thereof.

Obviously such a magazine is easy and inexpensive to manufacture since the retaining members are simply flat springs formed from the drawer-like components all in one molding step. It is also pointed out that, rather than larger, the magazine is now smaller since there is no space needed for the deflection of the locking members.

Also, the side walls of the normal cassette boxes are fitting the cassettes so closely that only little space is taken up by them and that, furthermore, compression of the boxes by the springs of the drawer-like components deflects the walls of the boxes sufficiently to engage the cassettes and prevent them from rattling. Of course, rotation of the cassette reels is prevented since the cassette boxes are provided with projections which engage the reels when the boxes are closed. As a result the cassettes are retained and secured as safely as they are in the prior art magazines but, additionally, they are protected against dust by the original box and this box also provides for additional heat insulation and for additional protection against mechanical damages.

Also the arrangement of the magazine components and the magazine as a whole is such that the cassette boxes which are safely and securely engaged are easily grasped with the thumb and the index finger so that they can be removed and handled easily with one hand. This handling is particularly facilitated by providing for the projecting extensions of the drawer-like components a width of—with respect to the width of the cassette boxes—somewhat reduced size such that the extensions are not engaged by the fingers when the box is grasped. On the other hand it is pointed out that the projecting extensions greatly facilitate insertion of the box into the magazine spaces since they permit the sensing of the appropriate locations with the cassette boxes held between the inserting fingers and guide the boxes into the storage space as desired. Since the spring members formed from the drawer-like components are relatively wide, that is, at least ¼ of the respective width of the box, and extend in the direction of movement of the boxes into the magazine spaces, the specific surface pressure applied by the spring in order to compress the cassette box is relatively low providing for scratch-free operation and transmitting a smooth solid feel to the operator. Also, possible paper-titles cemented onto the boxes are treated gently. It is also noted that the compression of the wide side walls of the boxes by the spring members is centered on the center of the boxes and therefore stabilizes the boxes in position within the storage space so that vibration cannot cause the release of a box from its space within the magazine.

It has already been pointed out that the sensitive tape cassettes are better protected in the boxes from dust and mechanical damages and also from the influences of heat. Heat protection however is further enhanced by the installation in the magazine housing of plastic foam sheets disposed adjacent the housing bottom, top and side walls around the assembled drawer-like components and compressed therein. This not only reduces any rattling but also dampens any noises and provides for a solid feel when grasping the magazine. Furthermore there are means providing five-fold protection for the tapes: The outer housing envelope, the foamed plastic sheet, the material structure of the drawer-like components, the walls of the cassette box and the walls of the cassette itself.

SHORT DESCRIPTION OF THE DRAWINGS

FIG. 1 is a front view of the storage magazine;

FIG. 2 is a partial top view;

DESCRIPTION OF THE PREFERRED EMBODIMENTS

Figure 3:
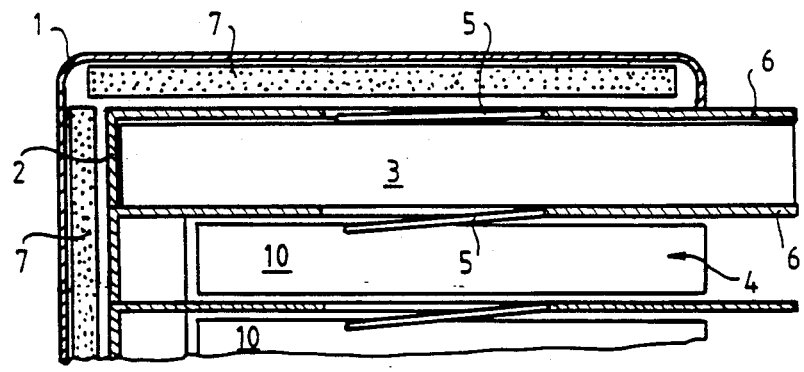
FIG. 3 is a partial sectional view along line III—III of FIG. 1.
Figure 4:
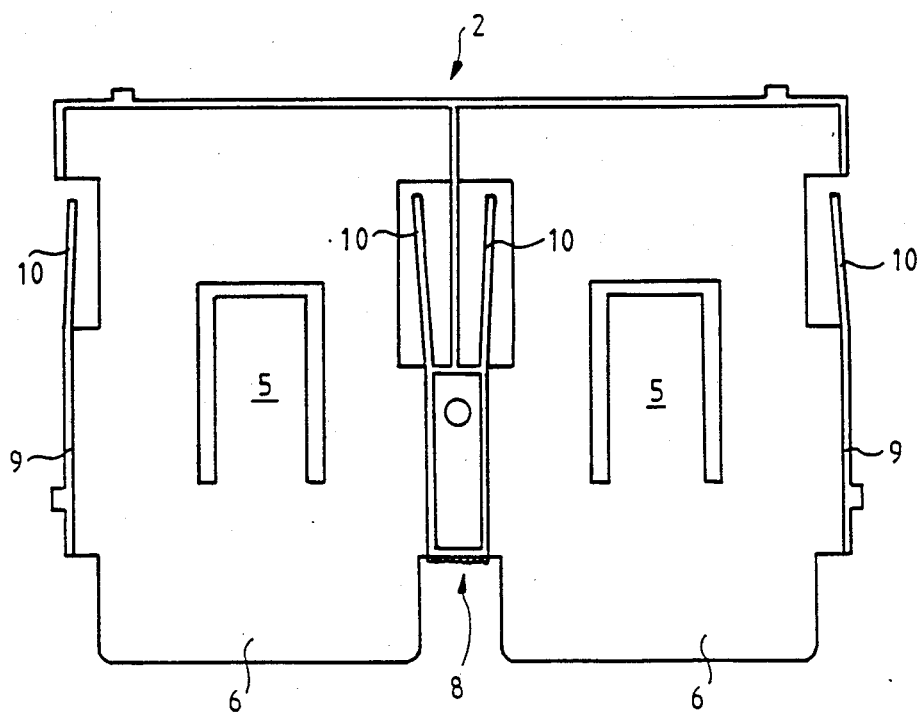
FIG. 4 is a bottom view of one of the inner drawer-like components.

As shown in FIG. 1 there are provided in a housing 1 drawer-like components 2 which define cavities 4 of a cross-section adapted to receive recording tape cassette boxes 3. The boxes 3 are inserted with their smallest side wall first into the cavities 4 and are retained in the cavities 4 by spring members 5 formed from the drawer-like components 2 and by leaf springs 10 projecting from the side walls thereof. The side walls 9 of the drawer-like components 2 are essentially flush with the front of the housing 1 and so is a separating structure 8 formed and arranged between two adjacent cavities 4, whereas the wide wall structures of the components 2 spanning the cavities, that is, defining the top of each cavity, have extensions 6 which project beyond the front of the housing. These tongue-like projecting extensions 6 are slightly narrower than the cavity or a cassette box so that the cassette box projects sidewise beyond an extension 6 as shown in FIG. 2. In this manner a cassette box inserted into a storage cavity can be grasped easily and securely for removal against the forces of the retaining springs.

Within the housing 1 there are disposed foamed plastic sheets 7 which line the housing walls and surround the drawer-like component structure 2. They serve as heat insulating members and they dampen any vibrations of the housing walls. They also absorb any rattling noises.

At its bottom the housing is provided with adhesive tapes for its mounting on an appropriate surface or there may be provided a mounting leg adapted to be mounted on a support structure.

As shown in the figures there are provided six cavities, three on top of one another in a side-by-side relationship. It is pointed out however that other arrangements are possible such as two or also four cavities in a column on top of one another and also a single column or more than two columns may be provided.

A cassette box inserted into any one of the storage cavities is smoothly centered by the springs formed from the side walls and will not cant in spite of some clearance between the cavity side walls and the cassette box. Also the spring tongue projecting from the cavity top wall will be deflected by the edges of the box but then it will depress the flat box top wall to form a box-retaining engagement arrangement. At the same time the cassette in the box will be engaged to prevent rattling thereof. The relatively large surface area of the spring tongue furthermore provides for only small surface pressures which avoids scratching of the box and transmits a feel of solidity to the user of the magazine.

What is claimed is:

1. A storage magazine for recording tapes especially for use in automobiles, comprising a housing having a plurality of chambers of a cross-section appropriate for slide-in reception of a cassette box, said chambers being formed between drawer-like plastic components disposed on top of one another within said housing, each said drawer-like component having a tongue-like extension projecting from said housing for facilitating insertion of such cassette boxes and said tongue-like extensions being narrower than the openings of said chambers to facilitate grasping and removal of the cassette boxes from said chambers, said drawer-like components having side walls at opposite sides of each chamber, each of said side walls having a leaf spring member extending substantially parallel to such side wall and projecting therefrom into the adjacent chamber so as to engage the side walls of a cassette box inserted into such chamber, said chambers being sized corresponding to the dimensions of a commercially available cassette box, and said drawer-like components further having formed therefrom adjacent each chamber a leaf spring-like smooth tongue structure depending from said drawer-like component into said chamber and having a spring force sufficient to deflect the adjacent wall of a cassette box into engagement with a cassette therein thereby to firmly engage said cassette within said cassette box and to prevent its rattling.

2. A magazine according to claim 1, wherein at least two chambers are arranged side-by-side and a separating structure is arranged between such two chambers to facilitate grasping of the boxes in said two adjacent chambers.

3. A magazine according to claim 1, wherein said chambers have a cross-section corresponding to the boxes' smallest cross-section.

4. A magazine according to claim 1, wherein said leaf spring-like tongue has a width of at least onefourth of the corresponding width of the chamber so as to engage the box over a relatively large area for reduction of specific surface pressure and prevention of scratch damage.

5. A magazine according to claim 1, wherein said leaf spring-like tongues and also said leaf spring members extend substantially parallel to the direction of movement of said cassette boxes into and out of said chambers.

6. A magazine according to claim 1, wherein plastic foam sheets are disposed around said drawer-like components adjacent the walls of said housing, said drawer-like components being disposed adjacent each other and compressed within said housing between said plastic foam sheets.

* * * * *